(12) United States Patent
Dupuis et al.

(10) Patent No.: US 10,703,279 B2
(45) Date of Patent: Jul. 7, 2020

(54) AUTOMATIC TRAILER DETECTION AND VEHICLE CONFIGURATION

(71) Applicant: Ford Global Technologies, LLC, Dearborn, MI (US)

(72) Inventors: Michael Dupuis, Sterling Heights, MI (US); David Joseph Orris, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/687,964

(22) Filed: Aug. 28, 2017

(65) Prior Publication Data

US 2019/0061626 A1 Feb. 28, 2019

(51) Int. Cl.
| | | |
|---|---|---|
| B60R 1/02 | (2006.01) | |
| B60R 1/07 | (2006.01) | |
| B60R 1/062 | (2006.01) | |
| B60R 1/072 | (2006.01) | |
| B60D 1/62 | (2006.01) | |
| G06K 9/00 | (2006.01) | |
| B60D 1/06 | (2006.01) | |

(52) U.S. Cl.
CPC ............... *B60R 1/025* (2013.01); *B60D 1/62* (2013.01); *B60R 1/062* (2013.01); *B60R 1/07* (2013.01); *B60R 1/072* (2013.01); *G06K 9/00791* (2013.01); *B60D 1/06* (2013.01); *B60R 2300/808* (2013.01)

(58) Field of Classification Search
CPC ...... B60R 1/025; B60R 1/07; G06K 9/00791; B60D 1/62; B60D 1/06
See application file for complete search history.

(56) References Cited

U.S. PATENT DOCUMENTS

| | | | |
|---|---|---|---|
| 6,505,780 B1 | 1/2003 | Yassin et al. | |
| 7,114,817 B2 | 10/2006 | Evans et al. | |
| 8,068,019 B2 | 11/2011 | Bennie et al. | |
| 9,037,349 B2 | 5/2015 | Trombley et al. | |
| 9,440,627 B2 | 9/2016 | Kurtovic et al. | |
| 2004/0246608 A1* | 12/2004 | Wellington | B60R 1/07 359/877 |
| 2007/0263301 A1* | 11/2007 | Agrest | B60R 1/025 359/843 |
| 2017/0140228 A1* | 5/2017 | Lang | G08G 1/167 |
| 2017/0287320 A1* | 10/2017 | Meade | B60D 1/62 |

FOREIGN PATENT DOCUMENTS

WO 2009/0141721 A1 11/2009

* cited by examiner

*Primary Examiner* — Jennifer D. Carruth
(74) *Attorney, Agent, or Firm* — Michael Fridman; Carlson, Gaskey & Olds, P.C.

(57) ABSTRACT

A system for adjusting vehicle mirrors is disclosed and includes a memory device including at least one saved mirror position corresponding with an identified trailer. At least one vehicle mirror is movable to an extended trailering position that corresponds with the saved mirror position. The memory device is part of a controller that moves the vehicle mirror to the saved position responsive to an indication that an identified trailer is hitched to the vehicle.

13 Claims, 3 Drawing Sheets

AUTOMATIC TRAILER DETECTION AND VEHICLE CONFIGURATION

TECHNICAL FIELD

This disclosure relates to a system for automatically adjusting a position of a tow vehicle side mirror responsive to hitching of a trailer.

BACKGROUND

Vehicles that are used to sometimes pull trailers can include an extendible side view mirror. The side view mirror is extended when the tow vehicle is towing a trailer to provide increased visibility of the trailer. When the trailer is unhitched, the side view mirror is returned to a non-extended position for normal vehicle operation. Each trailer has unique characteristics that can require different side mirror positioning. While the side view mirrors may be powered to the extended position, an operator may require significant time to properly adjust each of the mirrors. Moreover, in some instances, a vehicle operator may remember that the side view mirrors require adjustment only once driving down the road with the trailer hitched to the vehicle.

Automotive manufactures continue to seek improvements in vehicle operation with features that increase customer satisfaction and loyalty.

SUMMARY

An system according to an exemplary aspect of the present disclosure includes, among other things, a system for adjusting vehicle mirrors including a memory device including at least one saved mirror position corresponding with an identified trailer and at least one vehicle mirror movable to the saved mirror position responsive to detection of the identified trailer is hitched to the vehicle.

In a further non-limiting embodiment of the foregoing system for adjusting vehicle side mirrors including a detection device for indicating that a trailer is hitched to the vehicle.

In a further non-limiting embodiment of the foregoing system for adjusting vehicle side mirrors where the detection device includes a camera detecting a token disposed on the trailer.

In a further non-limiting embodiment of the foregoing system for adjusting vehicle side mirrors, the token comprises one of a bar code, matrix code, wireless transmission device, wired transmission device and a visible number on the trailer.

In a further non-limiting embodiment of any of the foregoing systems for adjusting vehicle side mirror the detection device includes a sensor detecting mating of a trailer hitch to the vehicle.

In a further non-limiting embodiment of the foregoing systems for adjusting vehicle side mirror where the at least one vehicle mirror comprises a side mirror that is extendible to a trailering position and the saved mirror position comprises adjustment of the side mirror to correspond with the identified trailer once in the trailering position.

In a further non-limiting embodiment of the foregoing systems for adjusting vehicle side mirror where the at least one saved mirror position further corresponds with a saved vehicle driver configuration.

In a further non-limiting embodiment of the foregoing systems for adjusting vehicle side mirror including saving a trailer configuration including features corresponding with the identified trailer.

A method according to another exemplary aspect of the present disclosure includes, among other things, a method of automatically adjusting vehicle mirrors including storing at least one saved mirror position corresponding with an identified trailer in a memory device on the vehicle and moving at least one vehicle mirror to the saved mirror position responsive to detection that the identified trailer is hitched to the vehicle.

In a further non-limiting embodiment of any of the foregoing methods including detecting that a trailer is hitched to the vehicle with a camera detecting a token disposed on the trailer.

In a further non-limiting embodiment of any of the foregoing methods including identifying the trailer based on information in a token disposed on the trailer and reading the token with a camera disposed on the vehicle.

In a further non-limiting embodiment of the foregoing method where the token comprises one of a bar code, matrix code, wireless transmission device, wired transmission device and a visible number on the trailer.

In a further non-limiting embodiment of any of foregoing methods including detecting that a trailer is hitched to the vehicle with a sensor detecting mating of a trailer hitch to the vehicle.

In a further non-limiting embodiment of any of foregoing methods where the at least one vehicle mirror comprises a side mirror that is extendible to a trailering position and moving the vehicle mirror to the saved position comprises moving the side mirror to the trailering position and then adjusting the side mirror to correspond with the identified trailer once in the trailering position.

In a further non-limiting embodiment of any of foregoing methods where storing the at least one saved mirror position further includes storing the at least one saved mirror position to correspond with one of a several saved vehicle driver configurations.

In a further non-limiting embodiment of any of foregoing methods including storing a trailer configuration including features corresponding with the identified trailer and associating the stored trailer configuration with at least one saved vehicle mirror position.

The various features and advantages of this disclosure will become apparent to those skilled in the art from the following detailed description. The drawings that accompany the detailed description can be briefly described as follows.

DETAILED DESCRIPTION

Figure 1:
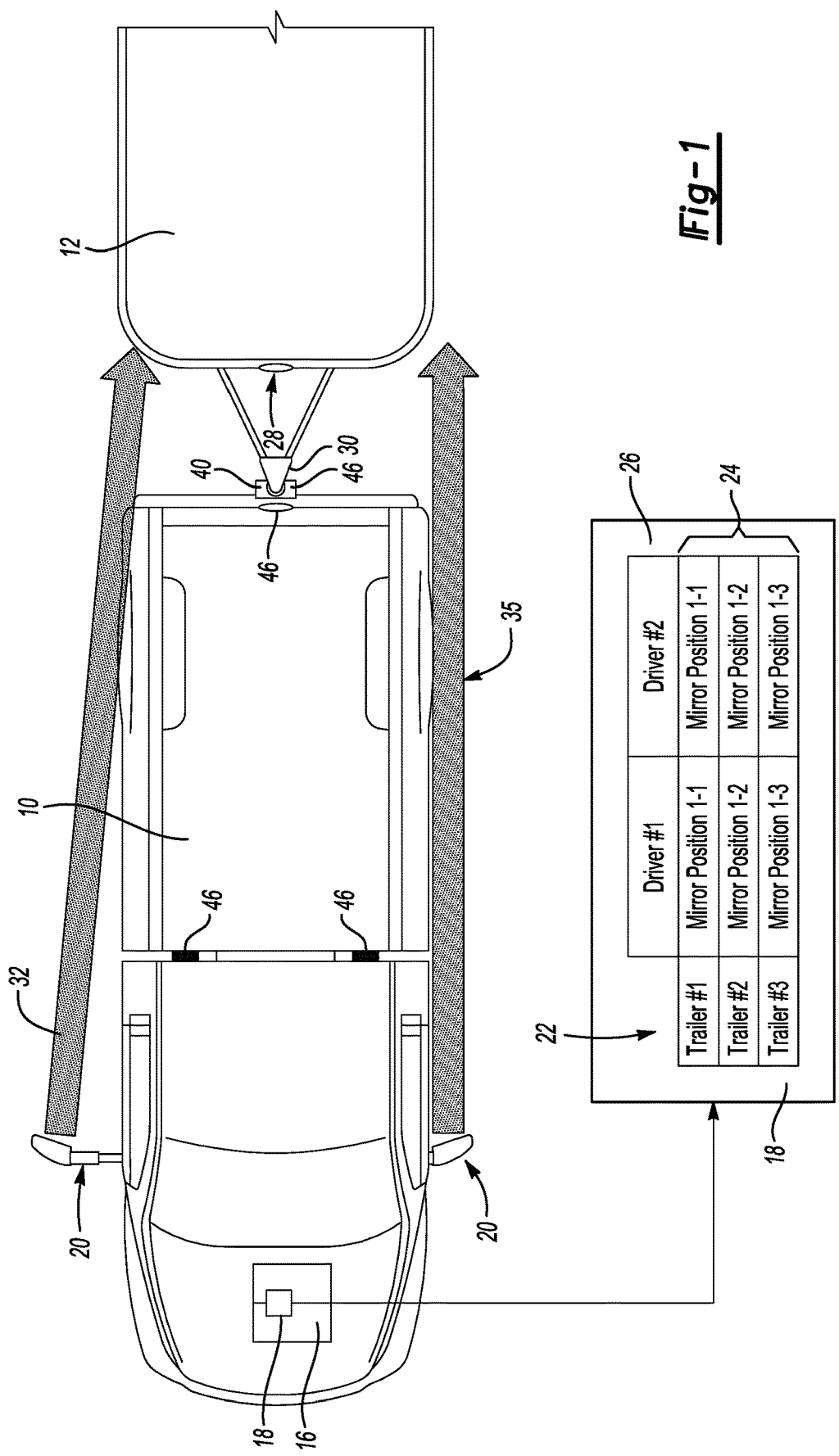
FIG. 1 is a schematic representation of a tow vehicle hitched to a trailer.

Referring to FIG. 1, an example vehicle 10 is schematically shown and is hitched to a trailer 12. In this example, the tow vehicle 10 is a pickup truck that includes a hitch 40 that provides for attachment to a trailer 12. The tow vehicle 10 includes side mirrors 20 and a controller 16 that includes a memory device 18. The side mirrors 20 provide a view along the side toward the rear of the tow vehicle 10 such that a driver within the vehicle 10 can see the trailer 12. The example tow vehicle 10 includes side view mirrors 20 that are extendable to a trailering position that provides a view schematically illustrated at 32 that is advantageous to towing the trailer 12.

The tow vehicle 10 includes cameras 46 that can be utilized to detect the presence of the trailer 12. The trailer 12 can include a token schematically shown at 28 that identifies the trailer 12 to the tow vehicle 10. The controller 16 of the tow vehicle 10 includes the memory 18 that stores mirror positions for each of several trailers 12 that may at one time be hitched to the tow vehicle 10. By storing mirror positions that correspond with a specific trailer 12, a tow vehicle 10 can extend and adjust the side view mirrors 20 to correspond with a specific trailer 12 thereby saving a vehicle operator time and effort.

The memory device 18 can store different trailer configurations indicated at 22 that correspond to one of several saved different mirror positions schematically indicated at 24. Each identified trailer 12 configuration and mirror position is also associated with a specific driver as indicated at 26. A driver #1 and a driver #2 are associated with several preset mirror positions 24 that correspond with one of several identified and stored trailer configurations.

Figure 2:
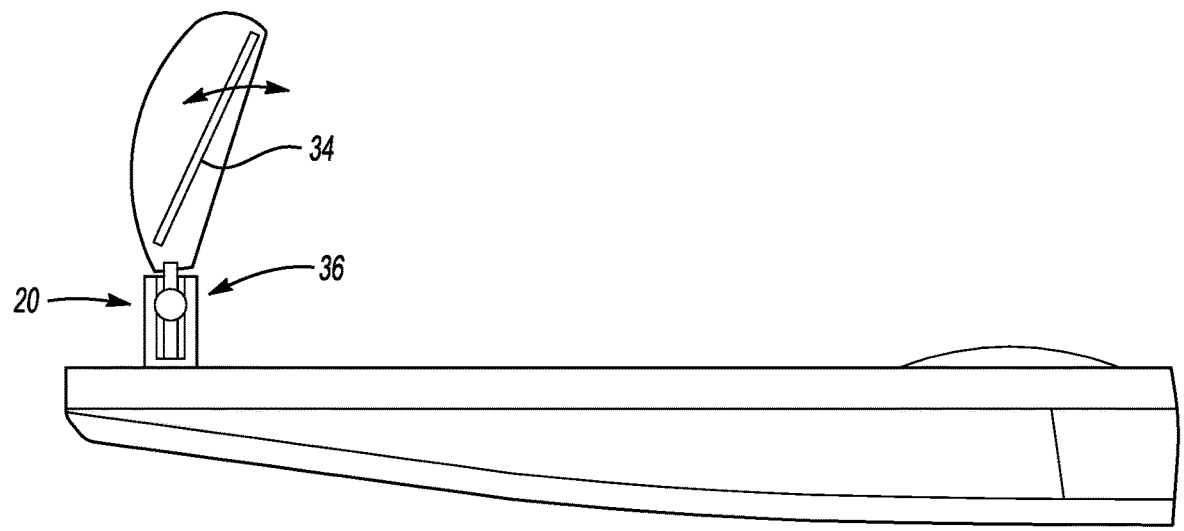
FIG. 2 is a top view of a side view mirror in a non-extended position.
Figure 3:
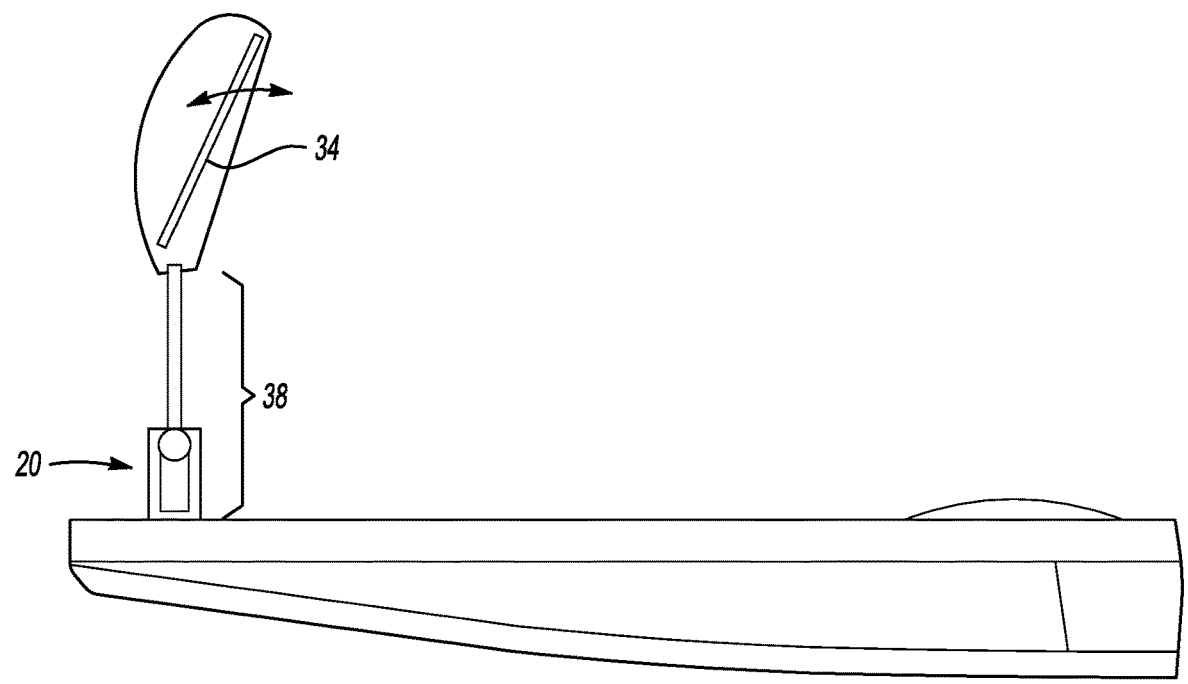
FIG. 3 is a top view of a side view mirror in an extended position.

Referring to FIGS. 2 and 3 with continued reference to FIG. 1, each of the side view mirrors 20 are movable from a normal position illustrated in FIG. 2 to an extended position schematically shown at 38 in FIG. 3. Once the side view mirror assembly 20 is moved to the extended position 38 as is illustrated in FIG. 3, the mirror 34 is adjusted to provide a desired view as is schematically shown at 32 in FIG. 1.

As is shown in FIG. 1, a normal view schematically shown at 35 does not provide a preferred angle to see the trailer 12. While the mirror 34 may be adjusted within the normal position illustrated at 36 in FIG. 2, that position is not the most favorable position to view the trailer 12. As appreciated, both side mirrors 20 would be extended to the trailering position as shown in FIG. 3 although only one of the side mirrors 20 is shown in the extended position for illustration of the disclosed example embodiment.

Accordingly, the example vehicle 10 includes the controller 16 that will automatically adjust the side view mirrors 20 to the extended trailering position illustrated in FIG. 3 and then further adjust the mirror 34 to the specific position and angle as is saved and associated with an identified trailer. The controller 16 will signal adjustment of the mirror assemblies 20 automatically upon recognition that a trailer 12 has been hitched to the tow vehicle 10. Once the controller 16 has verified that the trailer 12 has been hitched to the vehicle 10, the controller 16 will identify the trailer 12 through the use of the token 28 that is part of the trailer 12.

In one example, the token 28 comprises a barcode. In another example, the token 28 may also comprise a matrix two-dimensional barcode commonly referred to as a QR code. The token 28 may also be a number or other symbol that is detectable by one of the cameras 46 disposed on the tow vehicle 10. It should be appreciated, that any identifying symbol adhered to the trailer 12 that can communicate an identification of the trailer 12 to the controller 16 of the tow vehicle 10 could be utilized with the disclosed method and system and is within the contemplation of this disclosure. Moreover, the operator of the vehicle may communicate to the controller 16 what trailer is currently hitched to the vehicle 10. Additionally, the trailer 12 may include communication devices such as a wireless transceiver, blue tooth transmitter, radio frequency RF transmitter or any other known wireless communication device that enables communication directly with the controller 16 to identify the trailer and prompt adjustment of the side view mirrors 20. Additionally, once a wired connection is made between the vehicle 10 and the trailer 12, communication can be enabled between the controller 16 and trailer 12. The communication through the wired connection can provide both indication of hitching and also identify the trailer 12.

Figure 4:
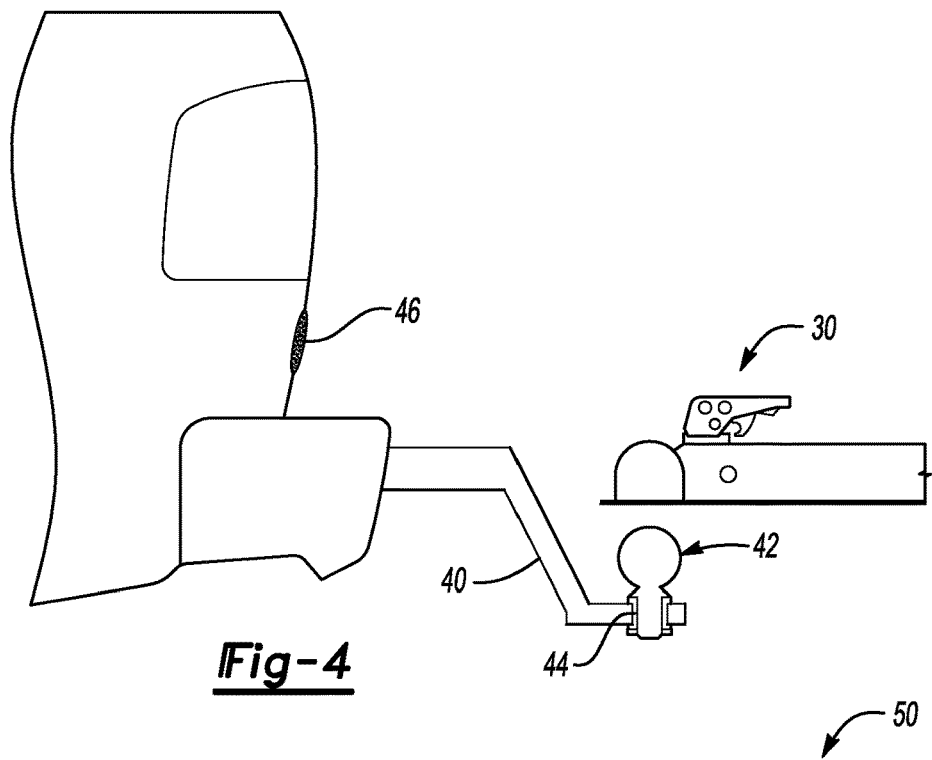
FIG. 4 is a schematic view of a vehicle and trailer hitch.

Referring to FIG. 4 with continued reference to FIG. 1, the controller 16 will initiate automatic adjustment of the side mirror assemblies 20 upon recognition that the trailer 12 has been hitched to the tow vehicle 10. The recognition that the trailer 12 has been hitched to the tow vehicle 10 can be provided by the cameras 46 or also may be provided by a sensor 44 that is associated with a hitch ball 42 of the vehicle hitch 40. Moreover, electrical connection between the tow vehicle 10 and the trailer 12 may also be utilized to recognize that the trailer 12 is hitched to the tow vehicle 10. Upon attachment of the trailer hitch 30 to the hitch ball 42, the controller 18 recognizes that the trailer 12 is hitched responsive to a signal from the sensor 44 and initiates automatic adjustment of the side mirrors 20. The adjustment to the side mirrors 20 will be based on the stored configurations present in the memory device.

Figure 5:
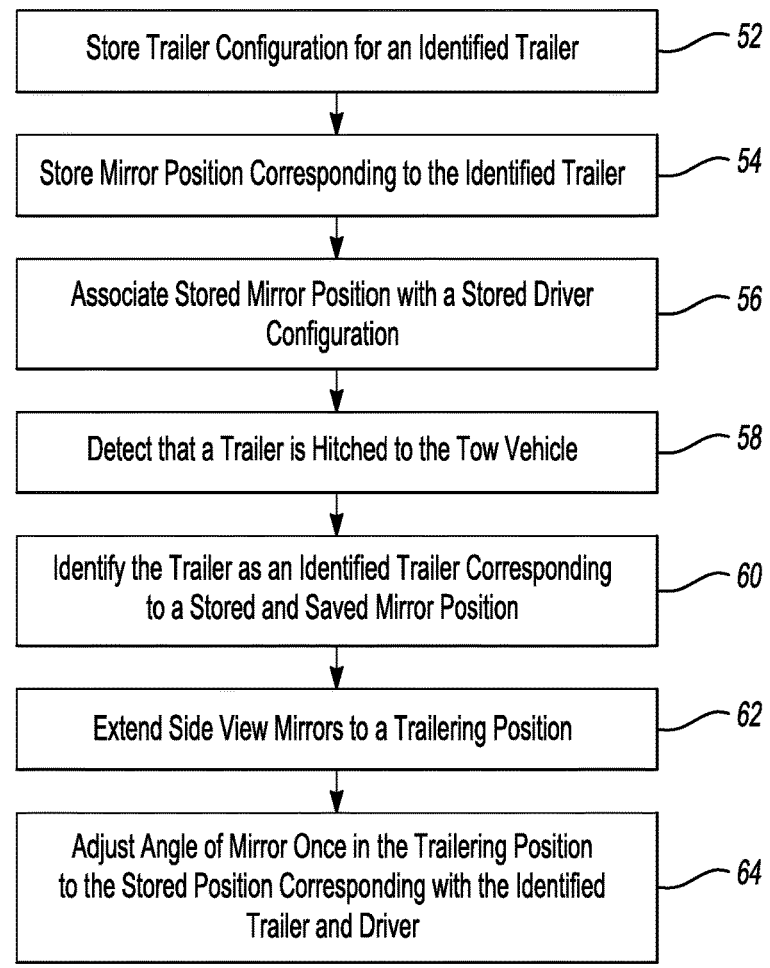
FIG. 5 is a flow diagram of example method steps according to a disclosed embodiment.

Referring to FIG. 5, the example mirror adjustment system operates, in one disclosed embodiment, as is schematically shown at 50 and begins with the initial step of storing trailer configurations for one or more identified trailers as is schematically indicated at 52. The stored trailer configurations can include features that are unique to that individual identified trailer that would aid and direct adjustment and identification of the particular trailer.

An operator of the tow vehicle 10 adjusts the side mirror position corresponding with the identified trailer and saves the adjusted position as is indicated at 54. As appreciated, the initial adjustment of the side view mirrors 20 will require an operator to adjust the side mirrors 20 to a preferred angle once moved to the extended trailering position that corresponds with the identified trailer. The preferred position is stored in the memory device 18 and associated with the specific driver as well as with the specific identified trailer. Accordingly, the memory device stores the mirror position and associates that mirror position with a driver and a trailer as is indicated at 56.

Once the mirror position is stored in the memory device 18, it is utilized by the controller 16 upon a detection that the trailer is hitched to the tow vehicle 10 as is indicated at 58. Detection that the trailer 12 is hitched to the tow vehicle can be facilitated by use of the sensor 44 associated with the hitch 40 as is illustrated and described with regard to FIG. 4. Alternatively, the cameras 46 can be utilized to recognize the token 28 affixed to a visible part of the trailer 12 as is schematically shown in FIG. 1.

Once the controller 16 has recognized that a trailer 12 has been hitched to the tow vehicle 10, the controller 16 will utilize the cameras 46 to interrogate the token 28 affixed to the trailer 12 to determine if the trailer 12 is one of the identified trailers stored in the memory device 18. In another example embodiment, the operator may select one of the stored trailer configurations that correspond with the trailer hitched to the tow vehicle 10. Once the controller 16 has either recognized or been instructed that the trailer is one of those identified and stored in memory device, the controller 16 will initiate extension of the side view mirrors to the trailering position as schematically indicated at 62 and shown in FIG. 3. With the side mirror assemblies 20 moved to the extended position, the mirror 34 will be adjusted to the position as saved in the memory device 18 and as schematically indicated at 64 and shown in FIG. 1. The mirror position will include a specific angle that corresponds with the driver preferred and saved mirror position that corresponds with the identified trailer 12.

Accordingly, the example system and method provides automatic adjustment of side view mirrors to the extended trailering position upon a recognition that a known identified trailer has been attached to a tow vehicle. By automatically adjusting the side view mirrors responsive to a known trailer hitching to the tow vehicle, the mirrors can be moved to a position that increases vehicle safety without relying on an operator remembering to adjust the mirrors.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for adjusting vehicle mirrors comprising:
   a memory device including at least one saved mirror position corresponding with an identified trailer; and
   at least one vehicle side mirror assembly including a mirror, the at least one side mirror assembly is extendible outward from a first position to a trailering position, the at least one vehicle side mirror assembly is automatically movable to the saved mirror position responsive to detection that the identified trailer is hitched to the vehicle, wherein in the saved mirror position the side mirror assembly extends outward to the trailering position and the mirror is adjusted to provide a view of the identified trailer and a detection device that includes a sensor detecting mating of a trailer hitch to the vehicle.

2. The system as recited in claim 1, wherein the detection device includes a camera detecting a token disposed on the trailer.

3. The system as recited in claim 2, wherein the token comprises one of a bar code, matrix code, wireless transmission device, wired transmission device and a visible number on the trailer.

4. The system as recited in claim 1, wherein the saved mirror position comprises adjustment of the side mirror to correspond with the identified trailer once in the trailering position.

5. The system as recited in claim 1, wherein the at least one saved mirror position further corresponds with a saved vehicle driver configuration.

6. The system as recited in claim 1, including saving a trailer configuration including features corresponding with the identified trailer.

7. A method of automatically adjusting vehicle mirrors comprising:
   storing at least one saved side mirror assembly position corresponding with an identified trailer in a memory device on the vehicle;
   detecting that a trailer is hitched to the vehicle with a sensor detecting mating of a trailer hitch to the vehicle; and
   automatically extending outward at least one vehicle mirror assembly from a first position to a trailering position and adjusting the mirror to the saved mirror position responsive to detection that the identified trailer is hitched to the vehicle.

8. The method as recited in claim 7, including detecting that a trailer is hitched to the vehicle with a camera detecting a token disposed on the trailer.

9. The method as recited in claim 7, including identifying the trailer based on information in a token disposed on the trailer and reading the token with a camera disposed on the vehicle.

10. The method as recited in claim 9 wherein the token comprises a bar code, matrix code, wireless transmission device, wired transmission device and a visible number on the trailer.

11. The method as recited in claim 7, wherein moving the vehicle mirror to the saved position comprises moving the side mirror to the trailering position and then adjusting the side mirror to correspond with the identified trailer once in the trailering position.

12. The method as recited in claim 7, wherein storing the at least one saved mirror position further includes storing the at least one saved mirror position to correspond with one of a several saved vehicle driver configurations.

13. The method as recited in claim 7, including storing a trailer configuration including features corresponding with the identified trailer and associating the stored trailer configuration with at least one saved vehicle mirror position.

* * * * *